(12) United States Patent
Sukhwani et al.

(10) Patent No.: US 10,984,669 B2
(45) Date of Patent: Apr. 20, 2021

(54) GENERATING A VIRTUAL INSTRUCTING PLATFORM FOR REPLICATING AND SHARING TEACHING STYLES

(71) Applicant: International Business Machines Corporation, Armonk, NY (US)

(72) Inventors: Mohak K. Sukhwani, Benares (IN); Aditya K. Sinha, Bangalore (IN); Vijay Ekambaram, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 15/988,047

(22) Filed: May 24, 2018

(65) Prior Publication Data
US 2019/0362641 A1    Nov. 28, 2019

(51) Int. Cl.
*G09B 5/12*    (2006.01)
*G09B 5/06*    (2006.01)
*G06T 19/00*   (2011.01)

(52) U.S. Cl.
CPC .............. *G09B 5/12* (2013.01); *G06T 19/006* (2013.01); *G09B 5/065* (2013.01)

(58) Field of Classification Search
CPC ........................................................ G09B 5/12
USPC ......................................................... 434/308
See application file for complete search history.

(56) References Cited

U.S. PATENT DOCUMENTS

| 5,537,141 A | 7/1996 | Harper |
| 2010/0167255 A1 | 7/2010 | Shane |
| 2012/0231441 A1 | 9/2012 | Parthasarathy |
| 2012/0329027 A1 | 12/2012 | Lewolt |
| 2013/0244218 A1 | 9/2013 | Cook |
| 2014/0024009 A1 | 1/2014 | Nealon |
| 2014/0127667 A1 | 5/2014 | Iannacone |

*Primary Examiner* — Kesha Frisby
(74) *Attorney, Agent, or Firm* — Joseph P. Curcuru

(57) ABSTRACT

Embodiments describe an approach for improving learning techniques based on a virtual augmented reality learning platform, comprising generating one or more augmented reality learning memories of one or more instructors teaching a task to one or more instructees. Creating ranking scores for the one or more augmented reality memories based on learning effectiveness of the one or more instructees. Incorporating a portion of the one or more augmented reality memories into a virtual augmented reality learning platform based on the ranking scores, and sharing the virtual augmented reality learning platform with the one or more instructees not associated with the portion of the one or more augmented reality memories.

20 Claims, 3 Drawing Sheets

GENERATING A VIRTUAL INSTRUCTING PLATFORM FOR REPLICATING AND SHARING TEACHING STYLES

BACKGROUND OF THE INVENTION

The present invention relates generally to the field of education and virtualization, and more particularly to augmented reality and virtual instructing platforms.

Child education and/or learning starts at home and parents are often considered the first teachers. In some cases, school teachers are burdened with large class sizes and tight schedules, in which children can be devoid of individual attention. In spite of the aforementioned setbacks, all students in a classroom are taught the same content, which is one of the factors resulting in the inability of some children to be able to grasp the content. The large class sizes and large student to teacher ratios can result in some children falling behind because of the unavailability of resources and/or inability of guardians/teachers to help the struggling students/children understand the concepts. When parents are actively and constructively involved in their children's education, it can make a very big difference in how well students do in school, which is why there is a need to empower parents to be better collaborators in their child's education, and to assist children/students performing at lower levels to ensure they have the same environment as their peers.

SUMMARY

Embodiments of the present invention disclose a method, a computer program product, and a system for improving learning techniques based on a virtual augmented reality learning platform. A method for improving learning techniques based on a virtual augmented reality learning platform, the method comprising, generating, by one or more processors, one or more augmented reality learning memories of one or more instructors teaching a task to one or more instructees. Creating, by one or more processors, ranking scores for the one or more augmented reality memories based on learning effectiveness of the one or more instructees. Incorporating, by one or more processors, a portion of the one or more augmented reality memories into a virtual augmented reality learning platform based on the ranking scores, and sharing, by one or more processors, the virtual augmented reality learning platform with the one or more instructees not associated with the portion of the one or more augmented reality memories.

A computer system for improving learning techniques based on a virtual augmented reality learning platform, the computer system comprising: one or more computer processors; one or more computer readable storage devices; program instructions stored on the one or more computer readable storage devices for execution by at least one of the one or more computer processors, the stored program instructions comprising, program instructions to generate one or more augmented reality learning memories of one or more instructors teaching a task to one or more instructees. Program instructions to create ranking scores for the one or more augmented reality memories based on learning effectiveness of the one or more instructees. Program instructions to incorporate a portion of the one or more augmented reality memories into a virtual augmented reality learning platform based on the ranking scores, and program instructions to share the virtual augmented reality learning platform with the one or more instructees not associated with the portion of the one or more augmented reality memories.

A computer program product for improving learning techniques based on a virtual augmented reality learning platform, the computer program product comprising: one or more computer readable storage devices and program instructions stored on the one or more computer readable storage devices, the stored program instructions comprising, program instructions to generate one or more augmented reality learning memories of one or more instructors teaching a task to one or more instructees. Program instructions to create ranking scores for the one or more augmented reality memories based on learning effectiveness of the one or more instructees. Program instructions to incorporate a portion of the one or more augmented reality memories into a virtual augmented reality learning platform based on the ranking scores, and Program instructions to share the virtual augmented reality learning platform with the one or more instructees not associated with the portion of the one or more augmented reality memories.

DETAILED DESCRIPTION

There is a need to create a collaborative environment where students and/or teachers can share their learning methods with others, in which children can choose a representation of the concept out of the multiple available options which suits them most. Similarly, there is a need to develop a system to generate a virtual instructing augmented reality platform for replicating and sharing teaching styles of instructors across students/instructees for effective learning. Embodiments of the present invention can create and/or generate a virtual instructing augmented reality platform for replicating and sharing parental teaching styles and/or any training and/or educational material. Embodiments of the present invention can index/catalog augmented reality (AR) memories indexed by homework ID and/or student ID on a cloud system and/or service; evaluate, rank, and/or sort the recorded and/or stored AR memories; and replicate and share augmented reality (AR) memories among weak students. Embodiments of the present invention enable better interaction between students, parents, and teachers, enable student and/or parents to select the best learning module form the student (e.g., not bound to specific objects and/or teaching modules/models, and are immersive and open ended which provides advantages and improvement to the art of teaching and education.

It should be noted that the term instructee comprises one or more student(s) and/or any person, item, and/or software program that can be taught and/or instructed (e.g., capable of learning).

It should be noted that the terms child/children and student(s) are used interchangeably herein (e.g., students can be children and children can be students). Students can be adults, children, and/or anyone or thing that can and/or is being taught (e.g., capable of learning).

It should be noted that the term instructor can be any person (e.g., parent, and/or teacher/educator) and/or anything (e.g., item and/or software program) that can instruct and/or teach/educate an instructee. Additionally, the term instructors(s) comprises at least one of one or more parents of a student or a teacher of the student.

Figure 1:
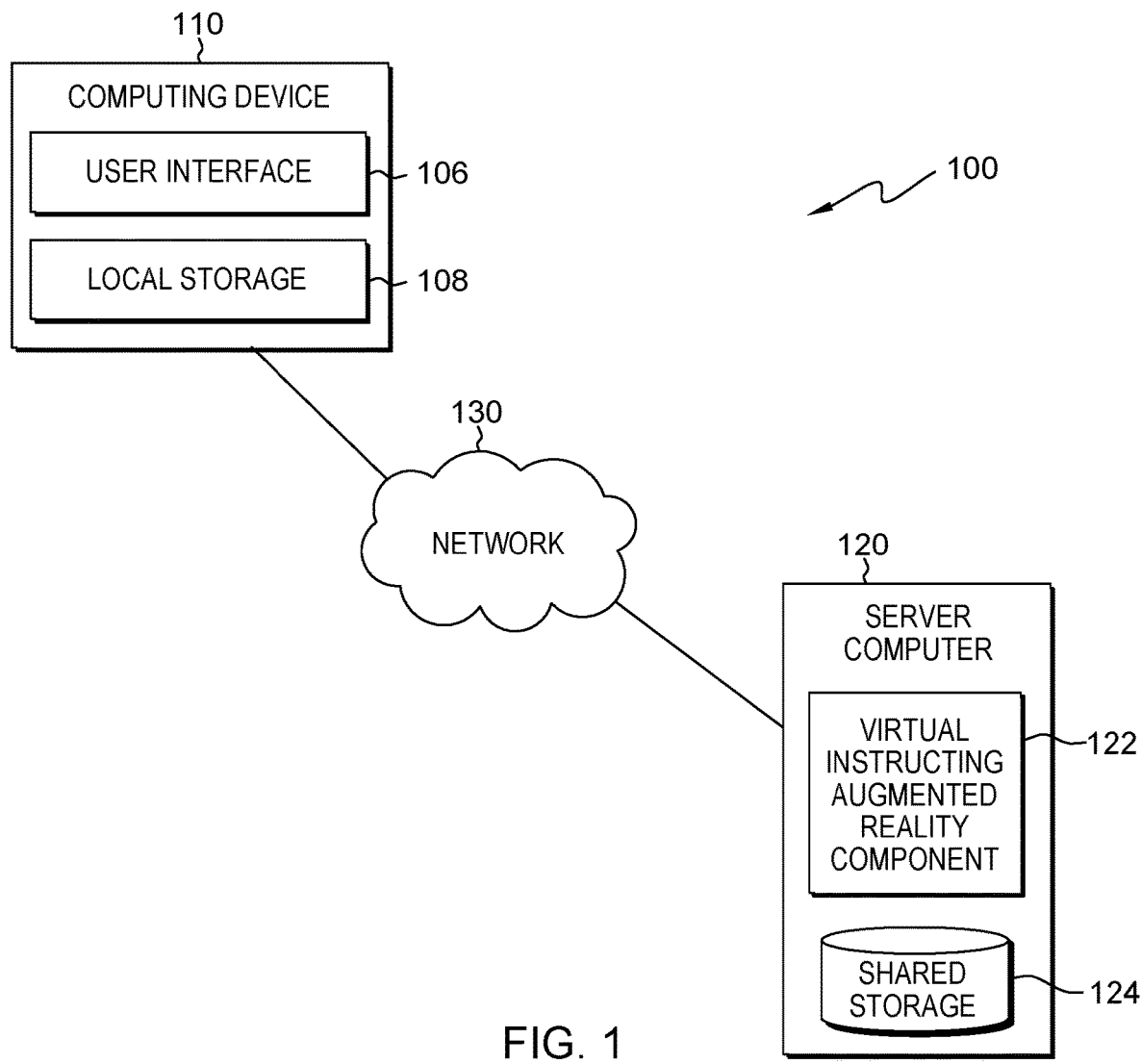
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments can be implemented. Many modifications to the depicted environment can be made by those skilled in the art without departing from the scope of the invention as recited by the claims.

Distributed data processing environment 100 includes computing device 110, server computer 120, interconnected over network 130. Network 130 can be, for example, a telecommunications network, a local area network (LAN), a wide area network (WAN), such as the Internet, a wireless technology for exchanging data over short distances (using short-wavelength ultra high frequency (UHF) radio waves in the industrial, scientific and medical (ISM) band from 2.4 to 2.485 GHz from fixed and mobile devices, and building personal area networks (PANs) or a combination of the three, and can include wired, wireless, or fiber optic connections. Network 130 can include one or more wired and/or wireless networks that are capable of receiving and transmitting data, voice, and/or video signals, including multimedia signals that include voice, data, text and/or video information. In general, network 130 can be any combination of connections and protocols that will support communications between computing device 110 and server computer 120, and other computing devices (not shown in FIG. 1) within distributed data processing environment 100.

In various embodiments, computing device 110 can be, but is not limited to, a standalone device, a server, a laptop computer, a tablet computer, a netbook computer, a personal computer (PC), a smart phone, a desktop computer, a smart television, a smart watch, a radio, stereo system, a cloud based service (e.g., a cognitive cloud based service), and/or any programmable electronic computing device capable of communicating with various components and devices within distributed data processing environment 100, via network 130 or any combination therein. In general, computing device 110 are representative of any programmable mobile device or a combination of programmable mobile devices capable of executing machine-readable program instructions and communicating with users of other mobile devices via network 130 and/or capable of executing machine-readable program instructions and communicating with server computer 120. In other embodiments, computing device 110 can represent any programmable electronic computing device or combination of programmable electronic computing devices capable of executing machine readable program instructions, manipulating executable machine readable instructions, and communicating with server computer 120 and other computing devices (not shown) within distributed data processing environment 100 via a network, such as network 130. Computing device 110 includes an instance of user interface 106. Computing device 110 and user interface 106 allow a user to interact with virtual instructing augmented reality component (VIARC) 122 in various ways, such as sending program instructions, receiving messages, sending data, inputting data, editing data, correcting data and/or receiving data. In various embodiments, not depicted in FIG. 1, computing device 110 can have one or more user interfaces. In other embodiments, not depicted in FIG. 1 environment 100 can comprise one or more computing devices (e.g., at least two).

User interface (UI) 106 provides an interface to VIARC 122 on server computer 120 for a user of computing device 110. In one embodiment, UI 106 can be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, UI 106 can also be mobile application software that provides an interface between a user of computing device 110 and server computer 120. Mobile application software, or an "app," is a computer program designed to run on smart phones, tablet computers and other mobile devices. In an embodiment, UI 106 enables the user of computing device 110 to send data, input data, edit data (annotations), correct data and/or receive data.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any other programmable electronic device capable of communicating with computing device 110 and other computing devices (not shown) within distributed data processing environment 100 via network 130. In another embodiment, server computer 120 represents a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 3.

Shared storage 124 and local storage 108 can be a data repository and/or a database that can be written to and/or read by one or a combination of VIARC 122, server computer 120 and/or computing device 110. In the depicted embodiment, shared storage 124 resides on server computer 120. In another embodiment, shared storage 124 can reside elsewhere within distributed data processing environment 100 provided coverage assessment program 110 has access to shared storage 124. A database is an organized collection of data. Shared storage 124 and/or local storage 108 can be implemented with any type of storage device capable of storing data and configuration files that can be accessed and utilized by server computer 120, such as a database server, a hard disk drive, or a flash memory. In other embodiments, shared storage 124 and/or local storage 108 can be hard drives, memory cards, computer output to laser disc (cold storage), and/or any form of data storage known in the art.

In some embodiments, shared storage 124 and/or local storage 108 can be cloud storage systems and/or databases linked to a cloud network.

In various embodiments, VIARC 122 can store and/or retrieve data (e.g., AR memories/AR assignments) from shared storage 124 and local storage 108. For example, VIARC 122 will store augmented reality (AR) lesson modules (AR assignments/lessons) to shared storage 124 to create AR memories, in which VIARC 122 can access at a later time to either reuse and share with other, and/or to assist in creating future lesson plans/modules and/or assignments. In another example, educators, students, and/or parents can access the saved AR memories to use as assignments and/or course material. In various embodiments, VIARC 122 can have cognitive capabilities and learn from previous files and/or data (e.g., AR memories) that VIARC 122 has interacted with and/or has stored to local storage 108 and/or shared storage 124. Such cognitive capabilities may include retrieving and analyzing previously generated AR memories and recommending corrections, changes, and/or emphasis on subject/topic material of a lesson module based on student performance, feedback, and/or success of an AR memory. AR memories can be, but are not limited to, aggregated and/or stored AR assignments. AR assignments can be, but are not limited to, assignments, homework, class work, exams, papers, one or more teaching styles, a lesson, a lesson plan, and/or any other educational tool and/or method known in the art that is conducted via augmented reality.

In various embodiments, VIARC 122 can enable and/or create/generate dynamic creation of Augmented Reality (AR) replicas/memories where students can understand and interact with an environment created by other students and/or one or more Educators (e.g., teacher(s), parent(s), legal guardian(s), etc.) to help understand and grasp educational, and/or teaching concepts (e.g., math, science, writing, etc). For example, the teacher assigns AR based homework (HW) assignments, which comprise a concept and subtasks (e.g., concept is multiplication and the subtasks are the multiplication tables of 1-5) to complete the assignment and also augmented inputs (e.g., helpful hints, voice overs, and/or instructions) from the teacher. In this particular example, a student wears an AR headset for the assignments in order to complete the assignment. In other embodiments, a student can use a mobile application on their phone to complete the AR assignment. In some embodiments, a group of students can interact with the AR memory as a group and/or as individual study.

In various embodiments, VIARC 122 can track instructor-instructee interaction during homework assignment in the augment reality space and construct AR memories/AR lessons based on the instructor-instructee interaction, success of the instructee, and/or teaching/instructor style, wherein the AR memories can be indexed and/or stored by homework ID and student ID on a cloud system, local storage 108, and/or shared storage 124. For example, Parents/Guardians assist Student 1 with the assigned augmented reality assignments, in which the Parents/Guardians help Student 1 complete the assigned collaboration tasks/sub tasks. In this particular example, the assigned augmented reality assignments include a pre-recorded presence by the teacher, in which VIARC 122 can annotate the steps as the sub tasks are completed by Student 1 and their Parents/Guardians by associating/tagging the homework ID with/to Student 1's student ID and storing the assignment and annotated steps as an AR memory. In some embodiments, the AR assignments can require the student and/or educator to log in into the virtual learning/parenting platform before the student and/or educator can access the assignment. For example, Student 1 logs into the education platform to access the AR assignments using the assigned student ID, and when Student 1 begins working on the assignment, the student ID is tagged and/or associated with assignment/homework ID and/or vise versa so the Educator(s) can track the progress of Student 1 through the assignment.

Furthermore, in some embodiments, VIARC 122 can track one or more student learner models (e.g., AR assignment/AR memory) with regard to homework assignments, via student ID and/or homework ID and rank the AR assignments/memories. For example, VIARC 122 can track the progress of Student 1, who is engaging with an interactive role play history lesson about Ancient Greece, by evaluating Student 1's homework assignments, quizzes, and research paper on Ancient Greece, and Student 1's evaluation of the lesson plan/learning model (e.g., AR assignment). In this particular example, VIARC 122 can track the progress of Student 2, who is engaging in a less interactive history lesson about Ancient Greece, and evaluate the two learning models/lesson plans (e.g., AR memories) and rank the two AR memories from most effective to least effective based on student progress/student success.

In this particular embodiment, VIARC 122 can create one or more shareable collaborative AR replicas/memories of one or more complete assignments and shares the one or more AR memories on one or more centralized hubs (e.g., a cloud system, local storage 108, and/or shared storage 124). For example, recording the interactive role play history lesson about Ancient Greece, generating the interactive role play history lesson into an interactive AR memory, and storing in a downloadable and/or streamable medium (e.g., a website, and/or storage database) for students and/or educators to access and use around the globe. In some embodiments, depending on the child's learner score model, VIARC 122 can mark/tag the AR memories as more suited to understand one or more concepts. For example, if a particular mathematics lesson yield positive scores and received positive feedback from the parents, teachers, and/or students VIARC 122 can tag the AR memory based on a predetermined grade scale/evaluation model. For example, the predetermined evaluation model can be a simple grading from 1-5 where 5 is least effective and 1 is most effective learning outcome.

In some embodiments, the grade scale/evaluation model can comprise test scores, student feedback, homework completion, assignment completion, improvement and/or decline in scores and/or grades, change in overall academic scores and/or grades (e.g., homework, quizzes, test, exams, presentations, projections, academic papers, etc.), and/or topic proficiency. In various embodiments, VIARC 122 can rank and prioritize AR memories. In various embodiments, student and/or educator feedback can be collected via surveys conducted after each subtask, mile marker, midway through an AR assignment/AR memory, at the beginning of an AR assignment/AR memory, and/or at the completion of an AR assignment/AR memory. In various embodiments, VIARC 122 can aggregate the created AR assignments, generate AR memories based on the AR assignments and rank the AR memories based on a predetermined evaluation model, output the ranked AR memories onto an augmented reality platform (e.g., a virtual parenting augmented reality platform) that can be accessed by students and/or educators and used for educating students.

In this particular embodiment, VIARC 122 can generate a virtual reality and/or augmented reality platform (e.g., a virtual parenting augmented reality platform) for replicating and/or sharing AR memories, and can index/catalog the aggregated and/or stored AR memories by homework ID and/or student ID. In various embodiments, a homework ID can be, but is not limited to, a unique code (e.g., a bar code, QR code, and/or any other code known in the art), and/or identification number, wherein the unique code and/or identification number contain imbedded information about the AR assignment such the subject/topic the AR assignment/ memory covers, the length of the AR assignment/memory, year it was created, ranking, level of difficulty, the author/ creator of the AR assignment/memory, and/or category/type of AR assignment/memory (e.g., interactive, role playing, etc.). In various embodiments, a student ID can comprise a student's personal information such as age, grade, special needs (e.g., dyslexia), standardized test scores, grades, assigned teachers, IQ score, preferred teaching styles, and/or any other form of information known in the art.

In various embodiments, AR memories can be clustered based on teaching style representations, in which outliers can be identified based on a predetermined evaluation model. Outliers can be ranked based on Delta and Engagement scores of the students who interacted with the lesson/ AR memory. In some embodiments, to resolve ambiguities in the outliers manual feedback is received from the experts (e.g., teachers/educators and/or parents) and/or students. In various embodiments, VIARC 122 can record a students and/or educators interaction and/or response to an AR assignment and use it to enhance the AR assignment when VIARC 122 stores the AR assignment as an AR memory, and compare recorded information between strong and struggling students to determine what the stronger and/or weaker students are doing differently. In a particular embodiment, VIARC 122 will record the responses to tasks, the body language, and/or habits from a strong student, Student 1, and emphasize/promote the aspects of the Student 1's recorded habits and responses in the AR memory in order to help weaker students grasp the material. For example, VIARC 122 notices that Student 1 who score 100 percent on the AR assignment used their fingers to calculate the math problems in the AR assignment, therefore VIARC 122 will prompt weaker students to calculate the math problem with their fingers.

Furthermore, in various embodiments, VIARC 122 can share top ranked AR memories of students who presented the highest scores with regard to homework assignments, projects, papers, exams and/or any other course work known in the art, with other students who presented low scores and recreate the parent-child and/or educator-student interaction that resulted in high scores, via AR memories, to assist the struggling students. In various embodiments, the shared AR memory enables parents/educators in the augmented reality space replicate the interactions of the predicted top AR memories. For example, VIARC 122 can share the same AR memory and/or replicate the same AR memory with other students (Student 2) with a lower learner score who might not have the same resources to understand the concept to use the AR replication/memory. In this particular example, Student 2 interacts with the AR replica exactly like Student 1 by replacing Student 1's character in the AR and can interact with the lesson plan to understand the concept.

In various embodiments, AR memories are generally ranked by evaluating, ranking, and sorting AR memories based on the scores of students; however, this process can be flawed because a student's score/grade may not reflect an educator's teaching capability, and a good score doesn't necessarily mean the lesson is good/effective. A more thorough method of ranking the AR memories can be by evaluating/calculating Teaching Style Representation, in which AR memory recording is represented in a multi-dimensional teaching space, as shown in Equation 1, comprising: (i) Text: processing audio/text logs to this representation; (ii) AR Objects: tracking of new AR objects as part of parent-child interaction; and/or (iii) Concepts: tracking of concepts introduced to teach child AR objects relations.

$$T\_Style = f(Text, AR\ Object, Concepts, Interactions) \quad \text{Equation 1:}$$

In this particular embodiment, AR memory ranking further comprises comparing and correlating teaching styles by find/identifying teaching style representations and grouping/ clustering them, and/or determining and/or identifying outliers of Equation 1, and determining how effective the identified outliers are. In various embodiments, clusters can be common and/or related teaching styles. Furthermore, in this particular embodiment, AR memory ranking further comprises aggregating and analyzing student engagement by processing student audio and/or text transcripts to determine a level of excitement, matching/correlating keywords that match the determined level of excitement to rate child's engagement levels, and computing and scoring an engagement vector (e.g., Bag of Word, Neural Network, etc.).

Additionally, in this particular embodiment, AR memory ranking further comprises ranking teaching styles. In this particular embodiment, unique teaching styles could be either bad or good; therefore, a user and/or VIARC 122 can check and/or determine the change in one or more student test, homework, assignment, project, research paper and/or presentation scores to evaluate the processed teaching styles via Delta ($\Delta$) Score. Additionally, a user and/or VIARC 122, via UI 106, can use predetermined engagement parameters to keep the effectiveness of the identified teaching style in the AR memory/lesson. In various embodiments, a good value (a value above a predetermined threshold) of $\Delta$ Score and engagement scores suggest a good 'unique' teaching style which can be directly selected for use and/or distribution and can be labeled as exceptional AR memories. In various embodiments, the selected AR memories, which are near the predetermined threshold, can be sent to manual annotators to rate on various scales. In other embodiments, the selected AR memories can be semi-automated by integrating manual and automatic annotation, via a user and/or VIARC 12 which decrease the manual effort, and/or annotation of the selected AR memories can be fully automated by VIARC 122. In various embodiments, the best/highest ranked teaching styles can be used to educate students who scored lower in similar topics/subjects. In some embodiments, a user and/or VIARC 122 can define one or more teaching style as a function of text, AR Object, concepts, and interactions.

In various embodiments, a teacher, educator, and/or parent can assign AR based assignments/AR memories involving interactive role playing assignments. In this particular embodiment, in order to complete the assignment, the student is instructed to wear an AR headset for the homework assignments. Additionally, the homework assignments can be instructed to request assistance from the student's Parent(s) (individual or both—depending on assignment) and request that the parent(s) collaborate with the student to complete assigned tasks, which includes the teachers pre-recorded presences. In this particular embodiment, VIARC 122 can annotate the sub tasks (e.g., section A, section B, etc.) performed by the student and/or parent(s) to complete the assignment, and because the assignments are in a digital domain, VIARC 122 evaluates the students performance in the AR memory. In this particular embodiment, the AR memories of the best performing students can be shared with weaker students through a proposed/pre-determined parent-child virtual parenting platform. For example, a teacher assigns AR based assignments involving interactive role playing involving farming in order to learn about math (addition, subtraction, multiplication, division, etc.) and business. In this particular example, the students are assigned an individual farm and instructed to divide up the seeds and the land and calculate the potential profit of the farmed produce after expenses. In this particular example, the parents are instructed to participate by being either farmhands and/or customers/consumers of the produce and negotiate prices.

In this particular example, as the students work through the assignment, VIARC 122 can annotate (e.g., provide an explanation, grade the students response, take note of any errors, generate comments on the student's performance, any/or any other form of annotating known in the art) the student's progress as the students advance through the assignment. In this particular example, VIARC 122 can evaluate and rank the completed AR assignments/AR memories based on the student's scores, student evaluation (via survey), and/or annotation of sub tasks. In various embodiments, VIARC 122 can recommend eliminating and/or emphasizing a sub task based on student evaluation/feedback (via survey), annotations, and/or student performance/scoring/grading. For example, a majority of students answered section B incorrectly and the collected student feedback generally stated that the section was extremely difficult; therefore VIARC 122 can notify an educator, via electronic mail, text, phone, and/or any other form of communication known in the art, and recommend the removal of section B based on the student scores and evaluations. In some embodiments, the AR based assignments can be group work assignments and include a plurality of students and/or parents.

In some embodiments, VIARC 122 can evaluate and rank AR assignments. For example, an AR assignment aimed to teach students the concept of counting small and large numbers, using Equation 1, Educator 1 utilizes an AR image of 3 kittens. In this particular example, VIARC 122 determines: the AR image comprises no text transcript; the AR objects to be a Cats; the concepts to be hunting mice and climbing tree; and the interaction to be grouping. Educator 2 utilizes an AR image of 2 motor vehicles, in which VIARC 122 determines: the AR image comprises not text transcript; the AR objects to be motor vehicles; the concepts to be wheels, seats, drive, and transportation; and the interaction to be grouping. Educator 3 utilizes an AR image of an abacus, in which VIARC 122 determines: the AR image comprises not text transcript; the AR object to be an abacus; the concepts to be ancient, calculator, and game; and the interaction to be beads group and counting. In this particular example, VIARC 122 determines and ranks the abacus AR memory as unique and the best suited learning model for large number counting; whereas, implementing 50 AR images of kittens and/or motor vehicles would be very cumbersome and hard to grasp for students. Therefore, in this particular example, VIARC 122 will output and share the abacus AR memory by uploading it to a virtual AR parenting platform (e.g., shared storage 124 and/or local storage 108). In various embodiments, an educator can select, create, and/or upload AR images for student lesson plans. In some embodiments, educators can select AR images for lesson plans/models from an object palette. In some embodiments, the object palette can dynamically populate depending on the AR environment/setting (e.g., if the table is the environment then a car will not be on the object palette).

In various embodiments, virtual AR parenting platforms can comprise: identifying effective and unique teaching modules and/or lesson plans (e.g., AR memories), constructing AR memories based on audio, AR objects selected, concepts and event interactions, prioritizing Top-K ranking of AR-memories of parent-child interactions, based on innovative teaching styles of parents derived from identifying outliers through inter AR memory comparisons and prioritizing them based on engagement & delta parameters, during homework assignments, and/or executing these Top-K memories in the AR space of other students based on their learner model profiling and current homework task being executed. In various embodiments Top-K can be a place holder variable that can be indicated by a user and/or Top-K elements can be elements where one or more user's can configure the value of K.

Figure 2:
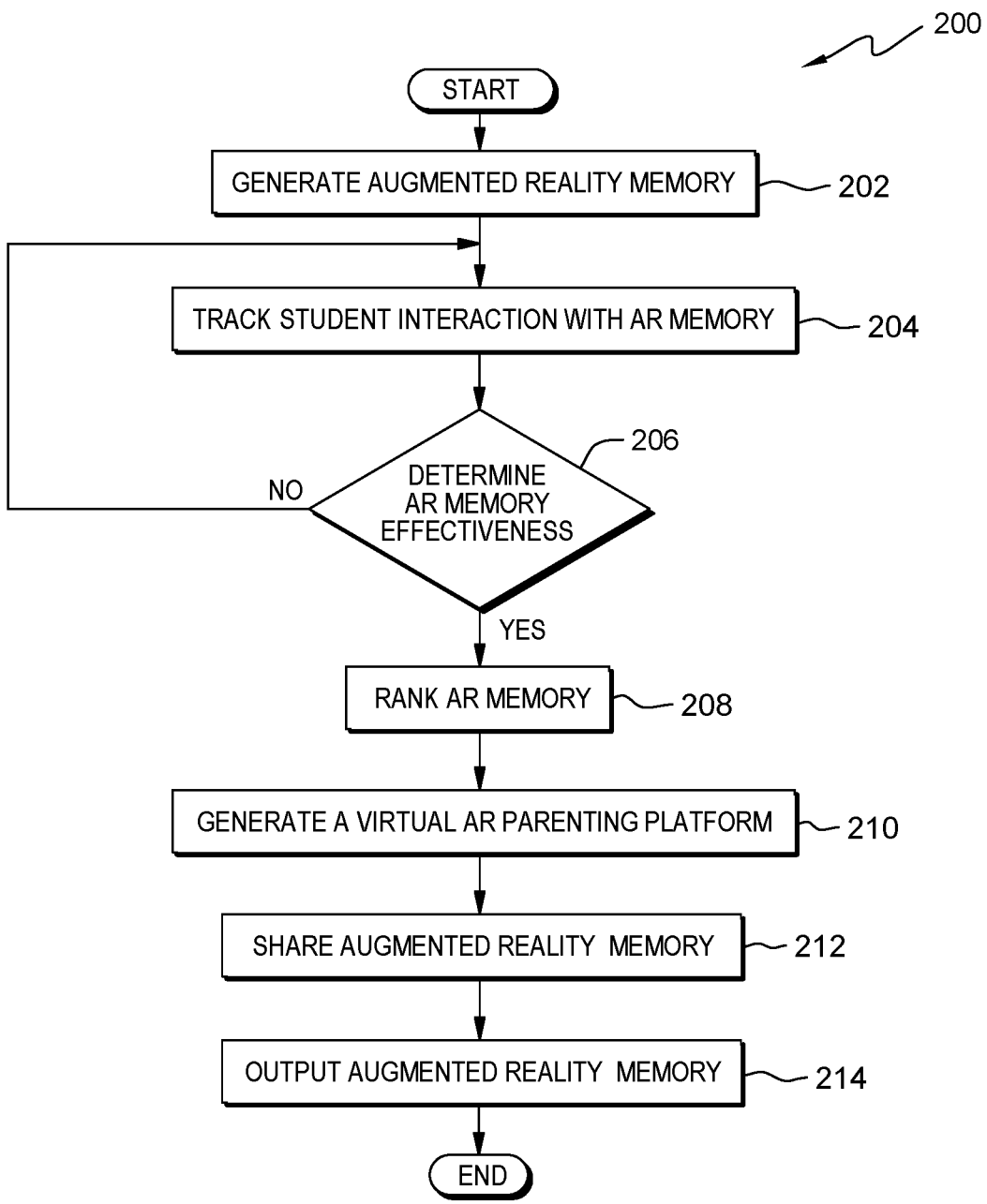
FIG. 2 illustrates operational steps of virtual 122, on a computing device within the distributed data processing environment of FIG. 1, in accordance with an embodiment of the present invention.
Figure 3:
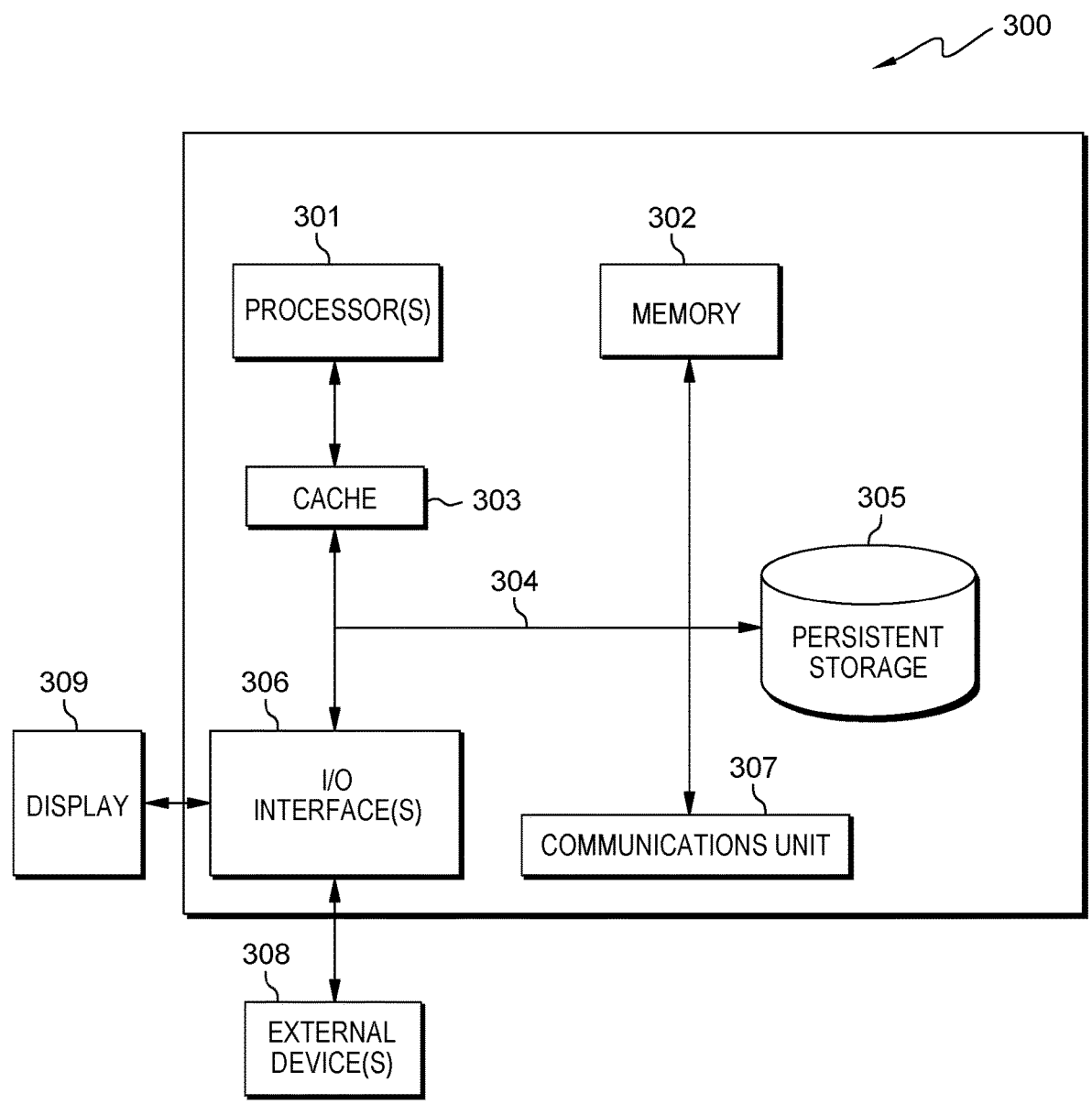
FIG. 3 depicts a block diagram of components of the server computer executing the intelligent mapping program within the distributed data processing environment of FIG. 1, in accordance with an embodiment of the present invention.

FIG. 2 is a flowchart depicting operational steps of VIARC 122, on server computer 120 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

In step 202, VIARC 122 generates an AR memory. In various embodiments, VIARC 122 can generate one or more AR memories based on stored and/or generated AR assignments. In step 204, VPAC 122 tracks student interaction with an AR memory. In various embodiments, VIARC 122 can track one or more parent-child interaction during assignments in the augment reality space and construct AR memories based on the parent-child interaction, success of the student/child, and/or teaching style, wherein the AR memories can be indexed and/or stored by homework ID and student ID on a cloud system, local storage 108, and/or shared storage 124. For example, Parents/Guardian assist Student 1 with the assignments and complete the assigned collaboration tasks/sub tasks, this includes teacher pre-recorded presence, in which VIARC 122 can annotate the steps as the sub tasks are completed by Student 1 and their guardian(s) by associating/tagging the homework ID with/to Student 1's student ID and store the assignment and annotated steps as an AR memory. In some embodiments, VIARC 122 can generate and/or retrieve one or more AR memories and/or AR assignments form shared storage 124 and/or local storage 108.

In step 206, VIARC 122 determines AR memory effectiveness. In various embodiments, VIARC 122 can determine the effectiveness of one or more AR memories in relation to student success and/or which AR memory has the best fit teaching style for a particular lesson. In various embodiments VIARC 122 can determine the effectiveness of one or more AR memories by comparing AR memories against other AR memories and/or other AR lessons/assignments. In various embodiments, VIARC 122 can compare one or more AR memories in order to determine which AR memories are better suited for a lesson and/or a student. For example, VIARC 122 can compare AR memories on counting to determine which AR memory related to math produces the highest success rate in students with dyslexia.

In step 206, VIARC 122 can determine AR memory effectiveness. In various embodiments, VIARC 122 can determine the effectiveness of one or more AR memories by tracking one or more students progress/progression through an AR memory and/or AR assignment/lesson, annotating student success and/or mistakes in the subtasks, reviewing and/or tracking student grades/scores and/or test scores, and/or administering and/or collecting student and/or educator surveys. In various embodiments, if VIARC 122 can not determine the effectiveness of one or more AR memory VIARC 122 can repeat steps 204-206 until effectiveness of an AR memory can be established and/or if overridden by a primary user (e.g., educator). In this particular embodiment, if VIARC 122 can determine the effectiveness of one or more AR memories then VIARC 122 can advance to step 208.

In step 208, VIARC 122 can rank an AR memory. In various embodiments, VIARC 122 can rank and/or prioritize one or more AR memories. In some embodiments, VIARC 122 can track one or more student learner models with regard to homework assignments, via student ID and/or homework ID and rank the AR assignments/memories. For example, tracking the progress of Student 1, who is engaging with an interactive role play history lesson about Ancient Greece, by evaluating Student 1's homework assignments, quizzes, and research paper on Ancient Greece, and Student 1's evaluation of the lesson plan/learning model (e.g., AR assignment). In this particular example, VIARC 122 can track the progress of Student 2, who is engaging in a less interactive history lesson about Ancient Greece, and evaluate the two learning models/lesson plans (e.g., AR memories) and based on student progress/student success rank the two AR memories from most effective to least effective. In this particular embodiment, AR memory ranking further comprises comparing and correlating teaching styles by find/identifying teaching style representations and grouping/clustering them, and/or determining and/or identifying outliers of Equation 1, and determining how effective the identified outliers are. In various embodiments, clusters can be common and/or related teaching styles. Furthermore, in this particular embodiment, AR memory ranking further comprises aggregating and analyzing student engagement by processing student audio and/or text transcripts to determine a level of excitement, matching/correlating keywords that match the determined level of excitement to rate child's engagement levels, and computing and scoring an engagement vector (e.g., Bag of Word, Neural Network, etc.).

In step 210, VIARC 122 generates a virtual AR instructing platform. In various embodiments, VIARC 122 can generate one or more virtual AR instructing platforms based on the ranked and stored AR memories. In various embodiments, the virtual AR instruction platform can be created by storing/creating a database of AR lessons/assignments and/or memories that can be accessed by instructors and/or instructees. In some embodiments, the virtual AR instructing platform can be stored on local storage 108 and/or shared storage 124. The ranked and stored AR memories can be stored on a cloud based system/repository that can be accessed by students and/or educators, via student ID and/or homework ID.

In step 212, VIARC 212 shares an AR memory. In various embodiments, VIARC 122 can share one or more AR memories to students and/or educators via the virtual AR parenting platform. In various embodiments, the shared AR memories are indexed and/or ranked for effectiveness. In step 214, VIARC 214 outputs an AR memory. In various embodiments, VIARC 122 can output one or more AR memories to one or more educators and/or one or more students via the virtual reality AR parenting platform.

FIG. 3 depicts a block diagram of components of server computer 120 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

FIG. 3 depicts computer system 300, where server computer 120 represents an example of computer system 500 that includes VIARC 122. The computer system includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention can be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 can also be removable. For example, a removable hard drive can be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 can provide communications through the use of either or both physical and wireless communications links. Program instructions and data used to practice embodiments of the present invention can be downloaded to persistent storage 305 through communications unit 307.

I/O interface(s) 306 enables for input and output of data with other devices that can be connected to each computer system. For example, I/O interface 306 can provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for improving learning techniques based on a virtual augmented reality learning platform, the method comprising:
    generating, by one or more processors, a virtual reality or augmented reality platform for sharing augmented reality memories to display in a virtual reality headset or on an augmented reality device;
    generating, by one or more processors, one or more augmented reality learning memories of one or more instructors teaching a task to one or more instructees to access through the virtual reality headset or on the augmented reality device;
    creating, by one or more processors, ranking scores for the one or more augmented reality memories based on learning effectiveness of the one or more instructees;
    incorporating, by one or more processors, a portion of the one or more augmented reality memories into a virtual augmented reality learning platform based on the ranking scores;
    sharing, by one or more processors, the virtual augmented reality learning platform with the one or more instructees not associated with the portion of the one or more augmented reality memories; and
    outputting, by one or more processors, the ranked augmented reality memories onto the virtual reality or the augmented reality platform for instructees to access through the virtual reality headset or on the augmented reality device.

2. The method of claim 1, wherein instructors comprise at least one of: one or more parents of a student or one or more teachers of a student, and wherein instructees comprises one or more students.

3. The method of claim 1, further comprising:
    tracking, by the one or more processors, interactions of the one or more instructees with the one or more augmented reality memories.

4. The method of claim 3, wherein the tracking further comprises: tracking the one or more augmented reality memories based on a student ID and a homework ID and evaluating at least one of: homework assignments, quizzes, scores, and grades of the one or more instructees.

5. The method of claim 1, further comprising:
    sharing, by one or more processors, the one or more augmented reality memories to the one or more instructees, and the one or more instructors.

6. The method of claim 1, wherein ranking further comprises:
    analyzing, by the one or more processors, engagement of the one or more instructees by processing audio and text transcripts of the one or more instructees to determine a level of excitement, correlating keywords that match the determined level of excitement to rate engagement levels of the one or more instructees, and computing and scoring an engagement vector; and
    ranking, by the one or more processors, teaching styles by determining a change in test, homework, assignment, project, research paper and presentation scores, of the one or more instructees to evaluate the processed teaching styles based on a Delta Score.

7. The method of claim 1, wherein determining the effectiveness of one or more augmented reality memories further comprises:
    comparing, by the one or more processors, the one or more augmented reality memories against other augmented reality memories, wherein comparing the one or more augmented reality memories is used to determine which of the one or more augmented reality memories are better suited for a particular instructee.

8. A computer system for improving learning techniques based on a virtual augmented reality learning platform, the computer system comprising:
    one or more computer processors;
    one or more computer readable storage devices;
    program instructions stored on the one or more computer readable storage devices for execution by at least one of the one or more computer processors, the stored program instructions comprising:
        program instructions to generate a virtual reality or augmented reality platform for sharing augmented reality memories to display in a virtual reality headset or on an augmented reality device;
        program instructions to generate one or more augmented reality learning memories of one or more instructors teaching a task to one or more instructees to access through the virtual reality headset or on the augmented reality device;
        program instructions to create ranking scores for the one or more augmented reality memories based on learning effectiveness of the one or more instructees;
        program instructions to incorporate a portion of the one or more augmented reality memories into a virtual augmented reality learning platform based on the ranking scores;
        program instructions to share the virtual augmented reality learning platform with the one or more instructees not associated with the portion of the one or more augmented reality memories; and
        program instructions to output the ranked augmented reality memories onto the augmented reality platform for instructees to access through the virtual reality headset or on the augmented reality device.

9. The computer system of claim 8, wherein instructors comprise at least one of: one or more parents of a student or one or more teachers of a student, and wherein instructees comprises one or more students.

10. The computer system of claim 8, further comprising:
    program instructions to track interactions of the one or more instructees with the one or more augmented reality memories.

11. The computer system of claim 10, wherein the tracking further comprises: tracking the one or more augmented reality memories based on a student ID and a homework ID and evaluating at least one of: homework assignments, quizzes, scores, and grades of the one or more instructees.

12. The computer system of claim 8, further comprising: program instructions to share the one or more augmented reality memories to the one or more instructees, and the one or more instructors.

13. The computer system of claim 8, wherein ranking further comprises:
program instructions to analyze engagement of the one or more instructees by processing audio and text transcripts of the one or more instructees to determine a level of excitement, correlating keywords that match the determined level of excitement to rate engagement levels of the one or more instructees, and computing and scoring an engagement vector; and
program instructions to rank teaching styles by determining a change in at least one of: test, homework, assignment, project, research paper and presentation scores of the one or more instructees to evaluate the processed teaching styles based on a Delta Score.

14. The computer system of claim 8, wherein determining the effectiveness of one or more augmented reality memories further comprises:
program instructions to compare the one or more augmented reality memories against other augmented reality memories, wherein comparing the one or more augmented reality memories is used to determine which of the one or more augmented reality memories are better suited for a particular instructee.

15. A computer program product for improving learning techniques based on a virtual augmented reality learning platform, the computer program product comprising:
one or more computer readable storage devices and program instructions stored on the one or more computer readable storage devices, the stored program instructions comprising:
program instructions to generate a virtual reality or augmented reality platform for sharing augmented reality memories to display in a virtual reality headset or on an augmented reality device;
program instructions to generate one or more augmented reality learning memories of one or more instructors teaching a task to one or more instructees to access through the virtual reality headset or on the augmented reality device;
program instructions to create ranking scores for the one or more augmented reality memories based on learning effectiveness of the one or more instructees;
program instructions to incorporate a portion of the one or more augmented reality memories into a virtual augmented reality learning platform based on the ranking scores;
program instructions to share the virtual augmented reality learning platform with the one or more instructees not associated with the portion of the one or more augmented reality memories; and
program instructions to output the ranked augmented reality memories onto the augmented reality platform for instructees to access through the virtual reality headset or on the augmented reality device.

16. The computer program product of claim 15, wherein instructors comprise at least one of one or more parents of a student or one or more teachers of a student, and wherein instructees comprises one or more students.

17. The computer program product of claim 15, further comprising:
program instructions to track interactions of the one or more instructees with the one or more augmented reality memories, wherein the tracking further comprises: tracking the one or more augmented reality memories based on a student ID and a homework ID and evaluating at least one of: homework assignments, quizzes, scores, and grades of the one or more instructees.

18. The computer program product of claim 15, further comprising:
program instructions to share the one or more augmented reality memories to the one or more instructees, and the one or more instructors.

19. The computer program product of claim 15, wherein ranking further comprises:
program instructions to analyze engagement of the one or more instructees by processing audio and text transcripts of the one or more instructees to determine a level of excitement, correlating keywords that match the determined level of excitement to rate engagement levels of the one or more instructees, and computing and scoring an engagement vector; and
program instructions to rank teaching styles by determining a change in at least one of: test, homework, assignment, project, research paper and presentation scores of the one or more instructees to evaluate the processed teaching styles based on a Delta Score.

20. The computer program product of claim 15, wherein determining the effectiveness of one or more augmented reality memories further comprises:
program instructions to compare the one or more augmented reality memories against other augmented reality memories, wherein comparing the one or more augmented reality memories is used to determine which of the one or more augmented reality memories are better suited for a particular instructee.

\* \* \* \* \*